United States Patent [19]
Williams et al.

[11] Patent Number: 5,785,324
[45] Date of Patent: Jul. 28, 1998

[54] FULL SURFACE TEXTURE COLLET SYSTEM

[75] Inventors: Roger O. Williams, Fremont; Jon A. Hoshizaki, Cupertino; Kevin C. Hursh, San Jose, all of Calif.

[73] Assignee: Exclusive Design Company, Fremont, Calif.

[21] Appl. No.: 694,438

[22] Filed: Aug. 12, 1996

Related U.S. Application Data

[63] Continuation-in-part of Ser. No. 300,277, Sep. 2, 1994, Pat. No. 5,560,624.

[51] Int. Cl.$^6$ ............................................. B23B 31/40
[52] U.S. Cl. .................... 279/2.03; 118/503; 269/48.1; 279/50; 279/2.21; 427/128; 451/63; 451/307
[58] Field of Search .................. 279/2.02–2.04, 279/2.1–2.12, 2.21, 2.22; 269/48.1; 360/86, 98.08, 99.05, 99.12; 369/261, 270, 271; 82/153, 155, 169; 451/63, 209, 307; 427/127–132; 118/500, 503

[56] References Cited

U.S. PATENT DOCUMENTS

| | | | |
|---|---|---|---|
| 4,208,061 | 6/1980 | Morawski | 279/2.04 |
| 5,560,624 | 10/1996 | Williams et al. | 279/2.03 |

*Primary Examiner*—Steven C. Bishop
*Attorney, Agent, or Firm*—Pennie & Edmonds LLP

[57] ABSTRACT

A collet system for mounting, holding, and rotating a rigid disk is described, the collet system including a collet and an expander, the collet having a base portion and fingers longitudinally extending therefrom, the fingers forming a disk contact ring opposite the base. The disk contact ring is less than the thickness of the disk to allow for full surface texturization of the disk. The disk contact ring is not coplanar with any locus of expansion contact points between the collet fingers and the expander, and is sufficiently distant therefrom such that the outward force exerted on the inner disk surface is determined by a cantilever spring deflection experienced by the fingers. This ensures substantially uniform and repeatable outward forces on the inner surface of the disk regardless of minor surface variations along the locus of expansion contact points.

16 Claims, 7 Drawing Sheets

FULL SURFACE TEXTURE COLLET SYSTEM

CROSS-REFERENCE TO RELATED APPLICATIONS

This application is a continuation-in-part of U.S. patent application Ser. No. 08/300,277, entitled "Disk Clamping Collet System," filed Sep. 2, 1994, now U.S. Pat. No. 5,560,624, and assigned to the assignee of the present invention. The subject matter of U.S. patent application Ser. No. 08/300,277 is hereby incorporated by reference.

FIELD OF THE INVENTION

The present invention relates to the field of electromechanical systems and processes for mechanically affecting the surfaces of disks. More specifically, the present invention relates to an apparatus for clamping, mounting, holding, and rotating a disk during a full surface disk texturizing, burnishing and buffing process.

BACKGROUND OF THE INVENTION

In present day computing systems a high demand has emerged for increased data storage capability in physically lighter and smaller mass memory storage devices. Magnetic media disk memories have necessarily become lighter and smaller, while at the same time becoming capable of storing more data than their physically larger predecessors.

In general, disk memories are characterized by the use of one or more magnetic media disks stacked on a spindle assembly and rotated at a high rate of speed. As requirements have emerged for these magnetic disks to be capable of more storage with less size and weight, the spacings and tolerances involved in disk recording systems have become exceedingly minute. As a result, the most important properties needed in advanced magnetic media disk memories are now generally of a mechanical nature.

The mechanical texturizing process of the surfaces of the disks, performed during disk manufacture, has become an increasingly delicate and exacting process. Most texturizing equipment utilizes an abrasive material, such as silicon carbide or aluminum oxide, for cutting small grooves in the disk, which is commonly made of aluminum. The material is typically bonded to a mylar-backed tape which is then passed over a cylindrical load roller. The tape is mechanically forced against the surface of the disk by the load roller. Commonly, two load roller assemblies are positioned side by side to texture the front and back surfaces simultaneously. To facilitate the texturizing process, the rigid-disk substrate is often rotated against the tape/roller system at a high rate of speed.

Assemblies which repetitively mount, hold, and rotate the rigid-disk substrates typically comprise a robot arm and a collet system. The robot arm seizes an untexturized disk from a disk source and positions the inner surface of the disk over the closed fingers of the collet system. An expander arm is then axially forced against the inside of the collet fingers, causing them to open and to thereby radially clamp the inner surface of the disk. The disk is held in place as a result of the radial pressure exerted by the outer surfaces of the collet fingers against the disk's inner surface. After texturization, the expander arm is axially released, closing the collet fingers to allow removal of the finished disk and mounting of the next disk for texturizing.

Figure 1:
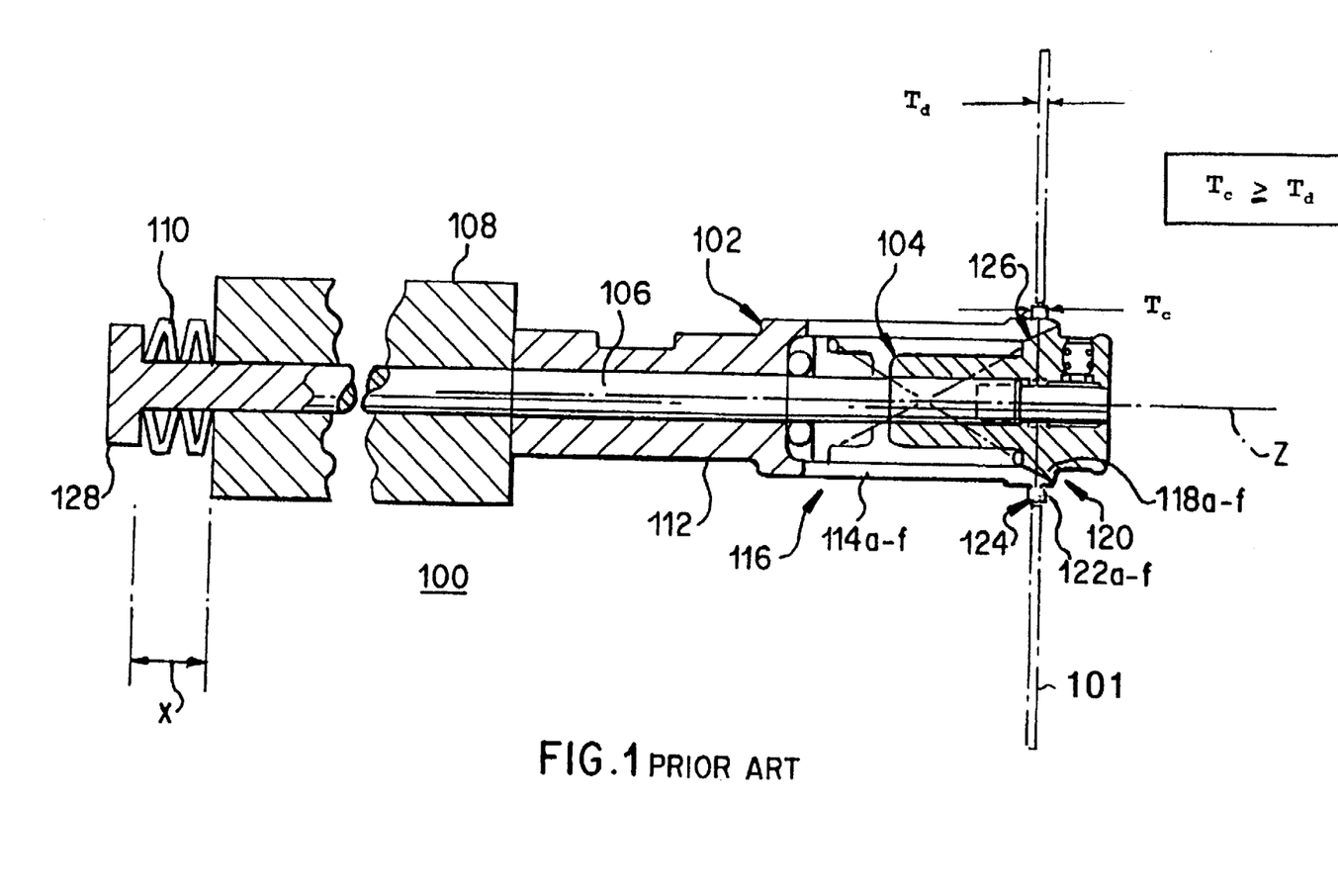
FIG. 1 represents a side view of a disk clamping collet system according to the prior art.

Problems have arisen regarding the prior art collet systems which mount, hold, and rotate the increasingly thin disk substrates, as will be described with reference to FIGS. 1 and 2. FIG. 1 shows a typical prior art disk clamping collet system 100. The purpose of disk clamping collet system 100 is to hold a nominally sized disk, denoted as element 101 in FIG. 1. Disk clamping collet system 100 comprises a collet 102, an expander 104, a draw bar 106, a spindle 108, and a spring means 110.

Collet 102 comprises a base 112 and fingers 114a, 114b, 114c, 114d, 114e, and 114f. Each of fingers 114a–f is a radially curved cantilever extending longitudinally from the base 112 and is integral with the base 112. Each of fingers 114a–f is radially curved around the axis of rotation of the collet system 100, this axis being designated the z-axis in FIG. 1. Fingers 114a–f form a finger portion 116.

Finger 114a of collet 102 comprises an expansion portion 118a formed therein by a surface which slopes inwardly toward the base 112 and z-axis, as shown in FIG. 1. Fingers 114b–f likewise comprise expansion portions 118b–f, respectively. Expansion portions 118a–f form an expansion portion 120.

Finger 114a of collet 102 further comprises a disk contact ring segment 122a formed thereon by a raised surface, the longitudinal dimension of which corresponds generally to the thickness of the disk to be mounted. Fingers 114b–f likewise comprise disk contact ring segments 122b–f, respectively. Disk contact ring segments 122b–f form a disk contact ring 124.

Disk clamping collet system 100 also comprises an expander 104. Expander 104 lies at least partially within a hollowed portion of the collet 102 formed by the longitudinally extending fingers 114a–f and comprises an expansion surface 126. Expansion surface 126 has a conical shape which generally forms a counterpart to the conical shape of the expansion portion 120 of collet 102. When expander 104 is urged in an axial direction toward the base 112 of collet 102, contact is made between the expansion surface 126 and the expanding portion 120 such that fingers 114a–f are each urged radially outward in a cantilever fashion. Disk contact ring 124 thus obtains a larger diameter and comes into contact with the inner circumference of the disk, thereby holding the disk in place.

Disk clamping collet system 100 further comprises a draw bar 106 which is axially affixed to expander 104 such that expander 104 is moved axially in response to movement of the draw bar 106. Disk clamping collet system 100 further comprises a spindle 108 which lies stationary with respect to the z-axis of FIG. 1, while collet 102 is axially affixed with respect to spindle 108. In this way, draw bar 106 and expander 104 are axially moved along the z-axis while collet 102 and spindle 108 are stationary along the z-axis of FIG. 1. Draw bar 106 further comprises an abutting end 128, wherein spring means 110 is positioned between abutting end 128 and spindle 108. The entire system 100 rotates around the z-axis.

Prior art disk clamping collet systems are deficient in several respects. For example, friction problems exist at the contact points between the expansion surface 126 and the expansion portion 120, exacerbated by the presence of free floating abrasives in the texturizing environment. This provides for a discontinuous and generally nonrepeatable relationship between (a) the inward force exerted on expander 104, and (b) the outward force exerted by the disk contact ring 124 on the inner surface of the disk. This discontinuous and nonrepeatable relationship exists not only among different disks due to small variations in their inner diameters, but also exists among different trials for the same disk due to frictional discontinuities between the expansion surface 126 and the expansion portion 120.

A further problem with collet system 100 is that texturization of the disk near the inner diameter of the mounted disk is prevented. Specifically, in prior art systems the disk contact ring 124 is generally of a thickness $T_c$ which is equal to or greater than the thickness $T_d$ of the mounted disk 101, as shown in FIG. 1.

Figure 2:
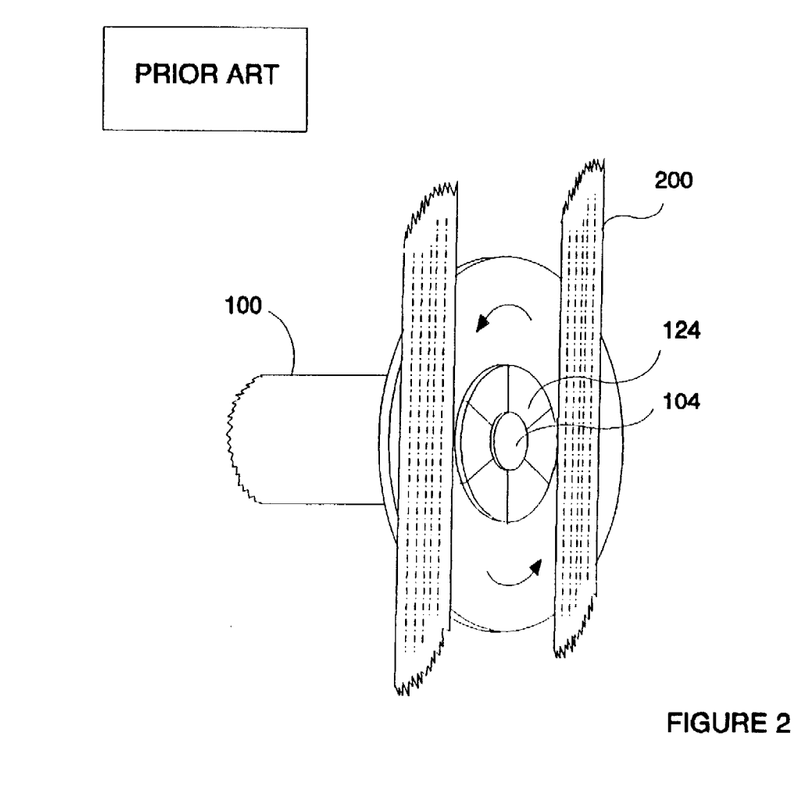
FIG. 2 is an oblique view of a portion of a disk clamping collet system according to the prior art with one side of the disk being texturized.

FIG. 2 shows a portion of the prior art system 100 in use, with the disk being texturized by texturizing tape 200 as the disk is rotated. For simplicity, only one side of the disk is shown being texturized. As shown in FIG. 2, the protruding disk contact ring 124 prevents the texturizing tape 200 from overlapping the disk's inner diameter, thus preventing valuable disk surface space near this inner diameter from being usable.

It is therefore an object of the present invention to provide an improved disk clamping collet system which provides for a more constant, repeatable outward radial force on a mounted disk during the disk texturizing process.

It is a further object of the present invention to provide a disk clamping collet system which is more tolerant to variations in inner disk diameters among a sample of nominally identical disks.

It is yet another object of the invention to provide a disk clamping collet system which is more tolerant to the presence of free floating abrasives in the disk texturizing environment.

It is still another object of the invention to provide for greater coupling force to rotate a mounted disk against the resistance of the texturizing abrasives, while avoiding warpage of the disk due to excessive outward radial forces on its inner circumference.

It is still another object of the present invention to provide for an improved disk clamping collet system which allows easier mounting of the disk by allowing for a greater margin of error in the centering of the disk as the disk is mounted by an external positioning mechanism.

It is still another object of the present invention to provide means for allowing the full surface of the disk to be texturized, including the portions nearest the inner diameter of the disk.

SUMMARY OF THE INVENTION

These and other objects of the present invention are provided for by an improved disk clamping collet system for mounting, holding, and rotating rigid-disk substrates in a computer disk surface texturizing system.

A disk clamping collet system in accordance with the present invention comprises an expanding collet having a base and fingers extending longitudinally therefrom. The expanding collet also includes a disk contact ring segmented to form a group of fingers for radially contacting an inner surface of the disk. The disk clamping collet system further comprises an expander for forcibly urging the fingers to radially expand such that the disk contact ring radially contacts the inner surface of the disk at a radial expansion contact locus. The fingers are designed such that the disk contact ring is offset from the radial expansion contact locus by a distance sufficient to cause the fingers to exert a cantilever-type spring force against the inner surface of the disk when the disk is mounted around the disk contact ring and the expander is at a predetermined nominal axial biasing position.

In a disk clamping collet system in accordance with the present invention, the disk contact ring is designed to have a thickness which is less than the thickness of the mounted disk. This permits the texturizing tape to overlap the inner diameter of the disk during the texturizing process, thus permitting the full surface of the disk to be texturized.

In one embodiment of the invention the disk contact ring comprises a textured surface on its outer diameter, this textured surface being formed with grooves which run substantially parallel to the axis of rotation. This increases the coefficient of friction between the disk contacting ring and the inside diameter of the disk. In another embodiment of the present invention the disk contact ring has a bevelled surface, the bevelled surface sloping inward toward the base of the collet. This downward slope of the disk contact ring compensates for the cantilever-like bending of the collet finger so as to maximize the surface area of contact between the disk contact ring and the disk, thereby maximizing the frictional contact between the disk contact ring and the disk.

BRIEF DESCRIPTION OF THE DRAWINGS

The above mentioned objects and other objects, features, and advantages of the invention may be better understood by referring to the following detailed description, which should be read in conjunction with the accompanying drawings in which:

FIGS. 7(a), 7(b1), and 7(b2) illustrate a collet of a disk clamping collet system in accordance with a third embodiment of the present invention.

DETAILED DESCRIPTION OF THE INVENTION

Figure 3:
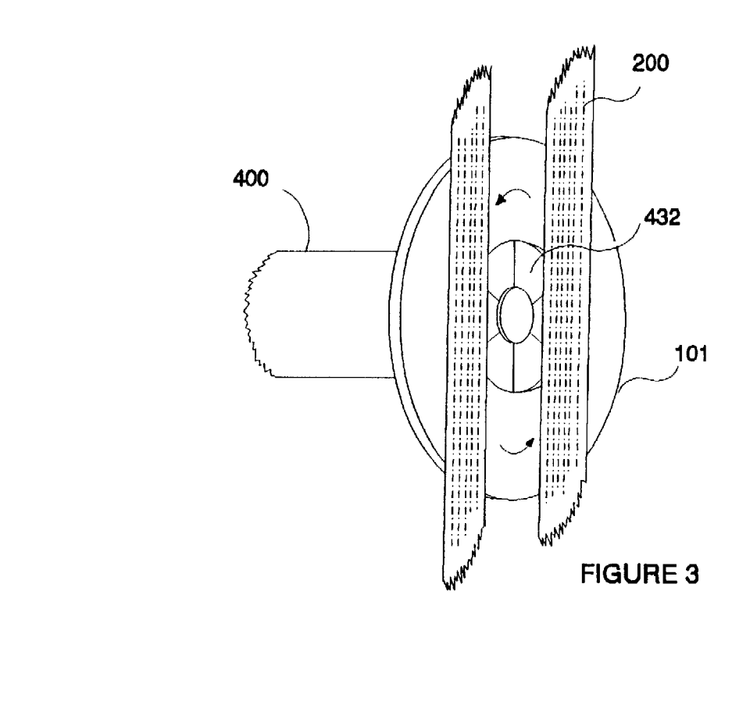
FIG. 3 is an oblique view of a portion of a disk clamping collet system in accordance with a first embodiment of the present invention with one side of the disk being texturized.

FIG. 3 is an oblique view of a portion of a disk clamping collet system 400 in accordance with a first embodiment of the present invention, with one side of a mounted disk 101 being texturized by external texturizing tape 200. For simplicity, only one side of the disk 101 is shown being texturized. As illustrated in FIG. 3, collet system 400 comprises a disk contact ring 432 wherein the thickness of the disk contact ring 432 is less than the thickness of the disk 101. This allows the texturizing tape to overlap the inner diameter of the disk, as shown in FIG. 3, thus permitting full surface texturization of the disk 101, including those portions near its inner diameter.

Figure 4:
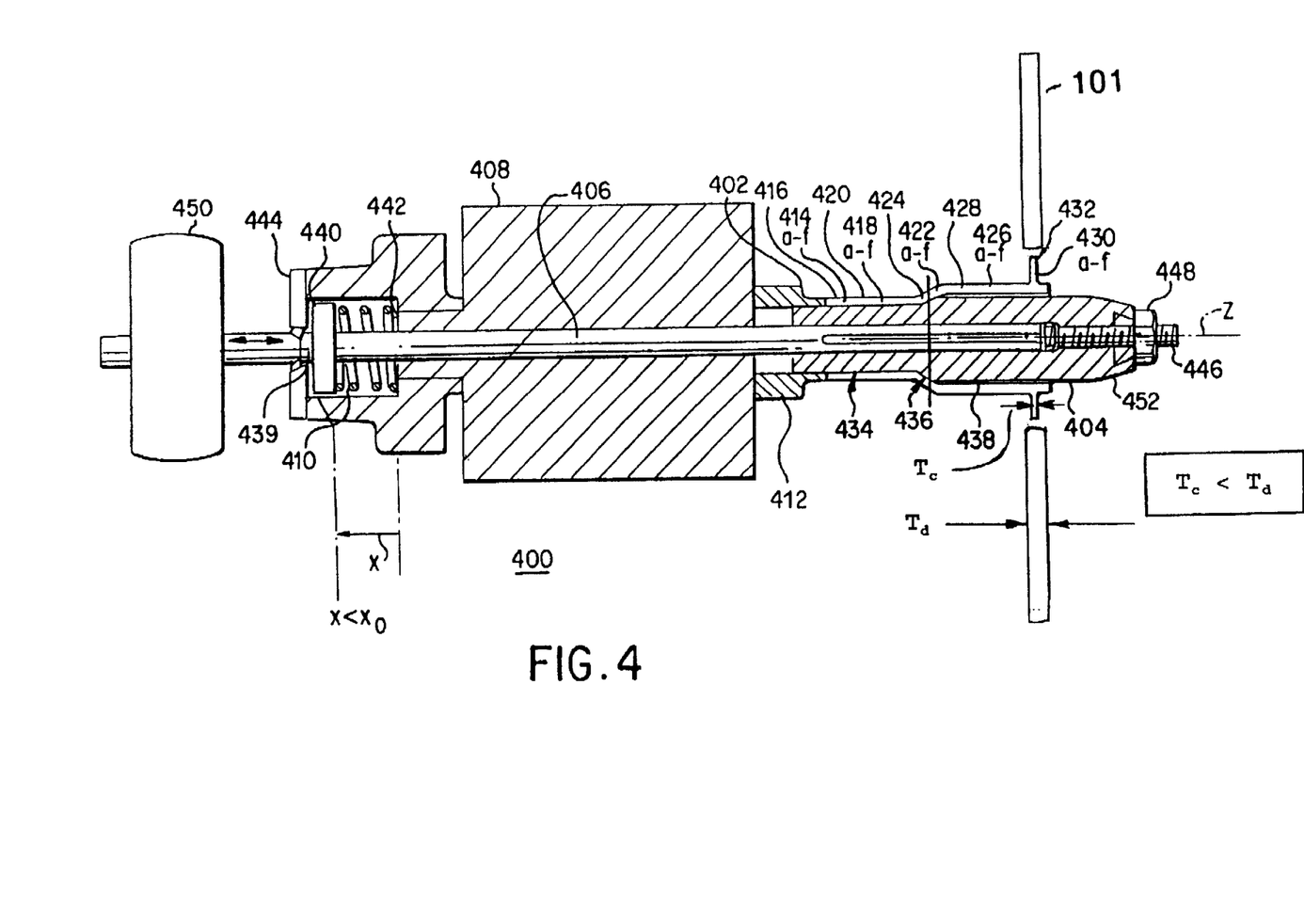
FIG. 4 is a cross sectional illustration of the disk clamping collet system of FIG. 3, the collet fingers being in an unexpanded state.
Figure 4A:
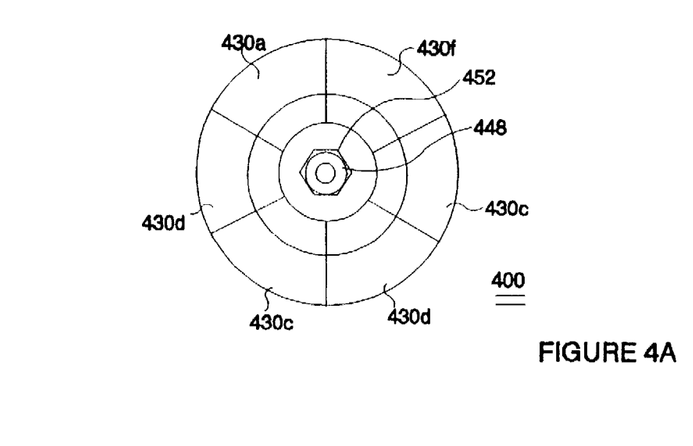
FIG. 4A is a end view of the disk clamping collet system of FIG. 4.

FIG. 4 is a more detailed cross sectional view of the disk clamping collet system 400 designed in accordance with the present invention. FIG. 4A is an end view of the disk clamping collet system of FIG. 4. Collet system 400 comprises a collet 402, an expander 404, a draw bar 406, a spindle 408, and a coiled spring 410.

Collet 402 comprises a base 412 and fingers 414a, 414b, 414c, 414d, 414e, 414f. Each of the fingers 414a–f is a radially curved cantilever extending longitudinally from the base 412 and is integral therewith. Each of fingers 414a–f is radially curved around the axis of rotation of the collet 400, this axis being designated the z-axis in FIG. 4. Each of fingers 414a–f is curved approximately sixty degrees around the z-axis and is separated from its neighboring fingers by radially oriented slots running along the z-axis. While the collet 402 in FIG. 4 has six fingers 414a–f, in general there maybe N fingers, in which case the arc covered by each finger around the z-axis will be approximately 360/N degrees. (For example, a collet with twelve fingers, each curved 30 degrees around the z-axis, has proven to be an effective design.) Fingers 414a–f are substantially identical to each other. Fingers 414a–f form a finger portion 416 of collet 402.

Finger 414a of collet 402 comprises a finger base portion 418a which, as shown in FIG. 4, is that portion of finger 414a which attaches to the collet base 412. In a like manner, fingers 414b–f further comprise finger base portions 418b–f, respectively. Finger base portions 418a–f form a finger base 420 of finger portion 416 of collet 402.

Finger 414a of collet 402 further comprises an expansion portion 422a formed therein by an inner surface which slopes inwardly toward the base 412, as shown in FIG. 4. Fingers 414b–f likewise comprise expansion portions 422b–f, respectively. Each of the expansion portions 422a–f comprise a surface which is at an angle with respect to the z-axis. Expansion portions 422a–f form an expansion portion 424 of finger portion 416 of collet 402.

Finger 414a of collet 402 further comprises an extension portion 426a, as shown in FIG. 4. Extension portion 426a is that portion of finger 414a which primarily experiences a cantilever spring force when a disk is mounted and the collet is expanded. Fingers 414b–f likewise comprise extension portions 426b–f, respectively. Extension portions 426a–f form an extension portion 428 of finger portion 416 of collet 402.

Finger 414a of collet 402 further comprises a disk contact ring segment 430a, as shown in FIGS. 4 and 4A. Disk contact ring segment 430a is that portion of finger 414a which contacts the inner surface of a mounted disk. Fingers 414b–f likewise comprise disk contact ring segments 430b–f, respectively, as shown in FIGS. 4 and 4A. Disk contact ring segments 430a–f form disk contact ring 432 of finger portion 416 of collet 402.

Disk contact ring segments 430a–f are integral with and formed on the extension portions 426a–f, respectively. The disk contact ring segments 430a–f are generally raised with respect to extension portions 426a–f to form disk contact ring 432, which thus has an annular shape. Each of the disk contact ring segments 430a–f, and hence disk contact ring 432, has a thickness $T_c$ as measured along the z axis. Let $T_d$ represent the thickness of the disk 101 which collet system 400 is designed to hold and rotate. According to the present invention, $T_c < T_d$ in order to allow full surface texturization, as described above with respect to FIG. 3.

In one embodiment of the invention, the size decision for $T_c$ is made by subtracting assembly and manufacturing tolerances from the minimum value of $T_d$ and allowing a small buffer to ensure clearance. As a result, $T_c$ is generally less than $T_d$ by a constant offset. By way of non-limiting example, one draft IDEMA (International Disk Drive Equipment and Materials Association) standard disk has an outer diameter of 65 mm and an inner diameter of 20 mm. A nominal disk thickness for the 65 mm disk is $T_d$=0.889 mm with a tolerance of plus or minus 0.025 mm. In this case, it has been found that one suitable value for $T_c$ is 0.66 mm with a tolerance of plus or minus 0.025 mm.

Each of the fingers 414a–f has a free end opposite the base 412 of collet 402, which represents the outermost point of the fingers 414a–f from the base. The cantilever action of fingers 414a–f occurs between the base 412 and the free ends of the fingers.

It is noted that among the inventive characteristics and features of the present invention, extension portion 428 is associated with that feature which allows the outward radial force exerted by the disk contact ring 432 on the inner surface of a mounted disk to depend on a cantilever spring force. A predetermined length by which the fingers 426a–f extend from the base portion is chosen such that the fingers 426a–f expand in a cantilever fashion. This predetermined length of the fingers is sufficient to offset the disk contact ring 430 from the radial expansion contact locus by an offset distance sufficient to ensure substantially uniform and repeatable outward forces around the disk contact portion 430 regardless of minor surface variations along the radial expansion contact locus. A tolerant relationship between the outward forces and the axial displacement of the expander 404 is thereby permitted, this tolerant relationship being characterized in that the outward forces have an approximately linear dependence on the axial displacement of the expander 404 over small axial displacements in the operating range.

As shown in FIG. 4, expander 404 of disk clamping collet system 400 is positioned at least partially within a hollowed portion of the collet 402 formed by the longitudinally extending fingers 414a–f. Expansion surface 436 is preferably of an annular, convexly curved shape. This permits contact with the inner surface of the expansion portion 424 at a single circular tangent, enhancing predictability and repeatability of results.

When expander 404 is urged in an axial direction toward the base 412 of collet 402, contact is made between the expansion surface 436 and the collet expansion portion 422 such that fingers 414a–f are collectively urged radially outward in a cantilever spring fashion. Disk contact ring 432 thus repositions to a larger diameter and comes into contact with the inner surface of the mounted disk, thereby holding the mounted disk in place.

When the mounted disk is in place, fingers 414a–f operate in a cantilever fashion which is now described. For simplicity, only finger 414a will be described and the other fingers 414b–f operate in a collectively similar fashion. Finger 414a is deflected among three contact points when the disk clamping collet system 400 is in operation and a disk is mounted.

The first contact point is the base 412 of the collet 402 to which finger base 418a of finger 414a is affixed. The second contact point is a locus of contact points between the expansion surface 436 and the expansion portion 422a of finger 414a. This locus of contact points is part of a "radial expansion contact locus" formed between collet 402 and expander 404. The "radial expansion contact locus" is the set of contact points between expander 404 and collet 402 which urges fingers 414a–f, or any selected combination thereof, to expand outward. The third contact point acting on finger 414a is the downward, i.e. radially inward, force exerted on the outer surface of the collet disk contact ring segment 430a by the inner surface of the mounted disk.

The disk clamping collet system 400 further comprises a draw bar 406 which is axially affixed to expander 404 such that expander 404 is axially displaced in response to axial displacement of the draw bar 406. The axially fixed position of draw bar 406 relative to expander 404 is adjustable. The disk clamping collet system 400 further comprises a spindle 408. Collet 402 is axially affixed with respect to spindle 408. Draw bar 406 and expander 404 are jointly axially movable along the z-axis relative to collet 402 and spindle 408.

The entire disk clamping collet system 400 rotates around the z-axis. Rotary driving means are attached to disk clamping collet system 400 to drive this rotation. These driving means are not shown in FIG. 4 and are beyond the scope of present disclosure.

In the embodiment of the invention presently being described, draw bar 406 comprises an abutting end 440. The disk clamping collet system 400 further comprises a first static abutment 442 which is axially fixed with respect to collet 402. The disk clamping collet system 400 further comprises a coiled spring 410 which lies between abutting end 440 of draw bar 406 and first static abutment 442. By contact with abutting end 440, coiled spring 410 urges draw bar 406 in a direction corresponding to an inward compressive movement of expander 404 into collet 402 toward collet base 412. As a result, expansion surface 436 of expander 404 is urged into contact with expansion portion 424 of collet 402.

The disk clamping collet system 400 further comprises a second static abutment 444 which is axially affixed with respect to collet 402. An appropriate coiled spring 410 is chosen to exert a force on abutting end (stop) 440 such that the inward axial force on expander 404 exceeds the opposite, i.e. outward, axial force exerted on expander 404 by fingers 414a–f during disk clamping collet system operation. As a result, coiled spring 410 urges the abutting end 440 of draw bar 406 away from first static abutment 442 until abutting end 440 is abuttably stopped by second static abutment 444. In the present embodiment, in operation, when abutting end 440 is abutted against the second static abutment 444, the second static abutment 444 provides an axial reference from which expander 404 is positioned at a predetermined nominal axial biasing position relative to collet 402. When the expander 404 is positioned in this predetermined nominal axial biasing position, and a mounted disk of nominal inner diameter is mounted on collet 402, the disk is ready for texturizing rotation. It is noted that second static abutment 444 also inherently serves the function of preventing over-expansion of the collet fingers 414a–f which could lead to damage of the collet 402.

Coiled spring 410 allows for a relatively high displacement range as compared to the belville springs used in the prior art device of FIG. 1. For example, where a typical prior art device had an axial displacement range of about 1/32 inches, the coiled spring 410 in a collet system according to the present invention allows the draw bar 406 to have a typical stroke length of approximately 1/8 inches.

Disk clamping collet system 400 further comprises a means for adjusting the predetermined nominal axial biasing position of expander 404 relative to collet 402. This means for adjusting 448 and 446 adjusts the axial position of expander 404 along the draw bar 406.

Figure 5:
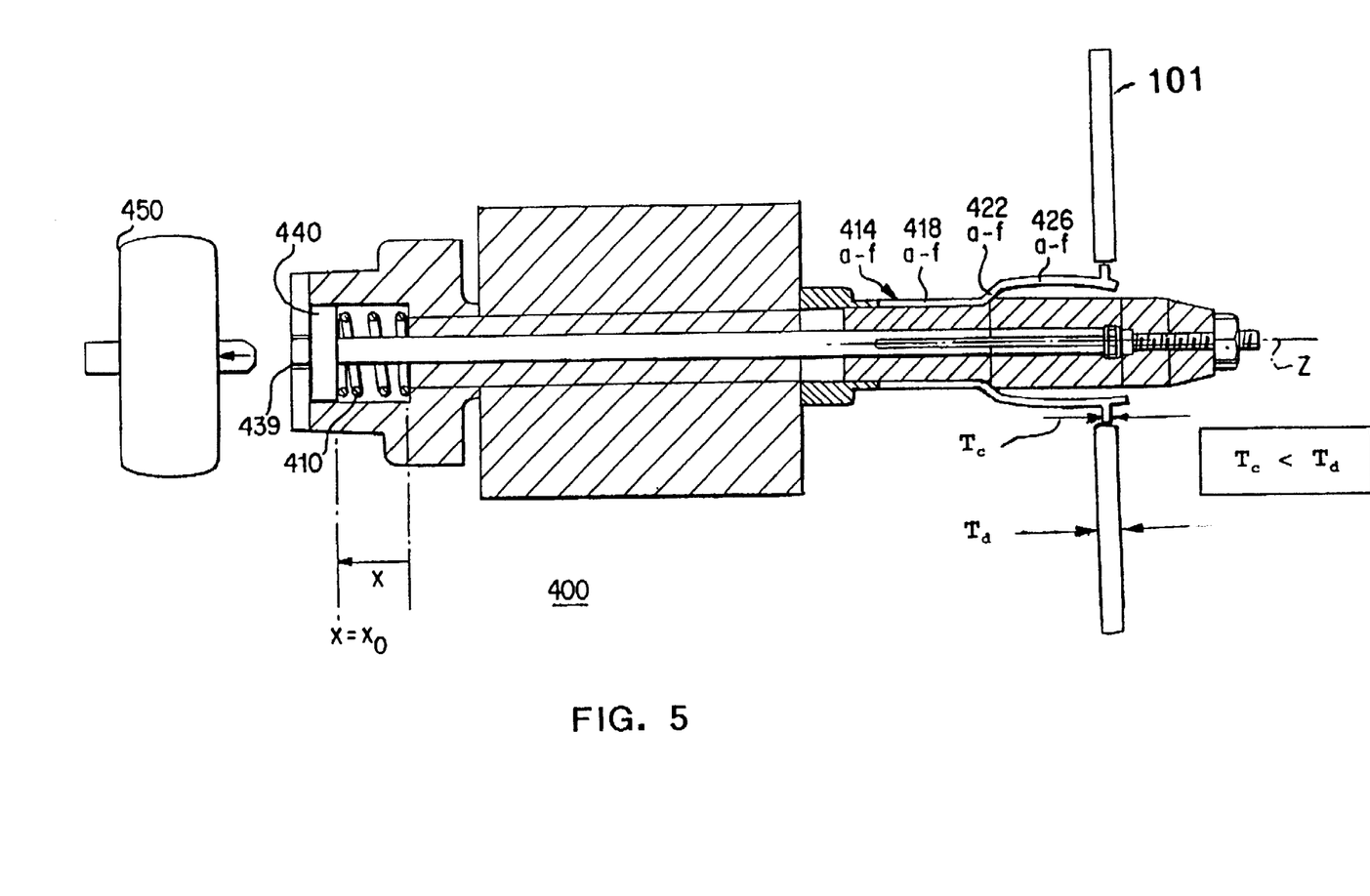
FIG. 5 is a cross sectional illustration of the disk clamping collet system of FIG. 3, the collet fingers being in an expanded state.

FIG. 5 represents disk clamping collet system 400 in an expanded state, wherein the expander 404 is in the predetermined nominal axial biasing position. It is noted that FIG. 5 is an exaggerated illustration, for purposes of clarity of explanation and understanding of the invention, and is not drawn to scale with respect to the cantilever deflections of fingers 414a–f.

It is to be appreciated that a disk clamping collet system according to the present invention provides for easier mounting of the disk because of a greater clearance between the collet fingers 414a–f and the disk inner surface when the collet 402 is in an unexpanded state. Due to the cantilever effect implemented in the present invention, the dynamic range of motion of the disk contact ring segments 430a–f is inherently greater than in prior art devices. Thus, in the unexpanded state, the disk contact ring 432 will generally have a smaller radius around the axis of rotation than that of a prior art device in an unexpanded state. This allows greater clearance for automated loading and unloading of the disk.

Figure 6:
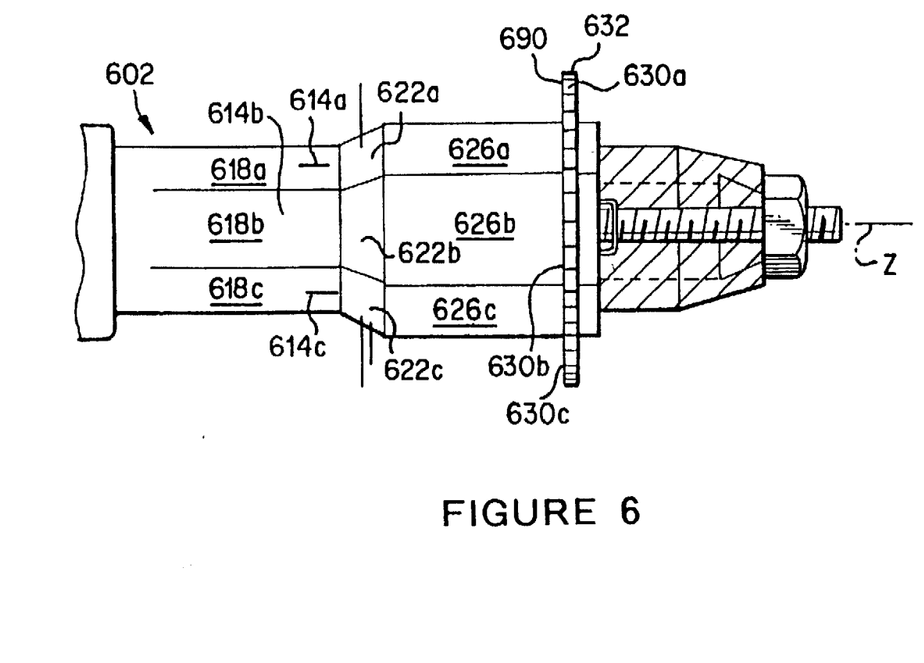
FIG. 6 illustrates a side view of a disk clamping collet system in accordance with a second embodiment of the present invention.

FIG. 6 illustrates a side view of a collet 610 of a disk clamping collet system 600 in accordance with a second embodiment of the present invention. FIG. 6 shows a collet 602 which comprises fingers 614a, 614b, 614c, 614d, 614e, and 614f. Each of fingers 614a–f in turn comprises components substantially identical to those of the collet fingers 414a–f in accordance with the first embodiment of the present invention as shown in FIG. 4. For example, finger 614a comprises a base portion 618a, an expansion portion 622a, an extension portion 626a, and a disk contact ring segment 630a. Disk contact ring segments 630a–f collectively form a disk contact ring 632, etc.

Collet 610 has been modified, however, in that disk contact ring segments 618a–f comprise a textured surface on the outer diameters, this textured surface being formed with grooves 690 running substantially parallel to the axis of rotation. The grooves 690 serve the function of providing an enhanced frictional contact between disk contact ring 632 and a mounted disk so as to enable increased rotational force.

FIG. 7 illustrates an expanded side view of a collet 702 of a disk clamping collet system 700 in accordance with a third embodiment of the present invention. Collet 702 comprises a base portion 712 along with collet fingers 714a, 714b, 714c, 714d, 714e, and 714f. Collet finger 714a comprises base portion 718a, expansion portion 722a, extension portion 726a, and disk contact ring segment 730a. Collet 702 is substantially similar to the collet 402 of FIG. 4 with the exception that disk contact ring segments 730a–f comprise inward sloping surfaces 730a'–730f' which slope inward toward base portion 712, as shown in FIG. 7(a).

Figures 7, 7B:
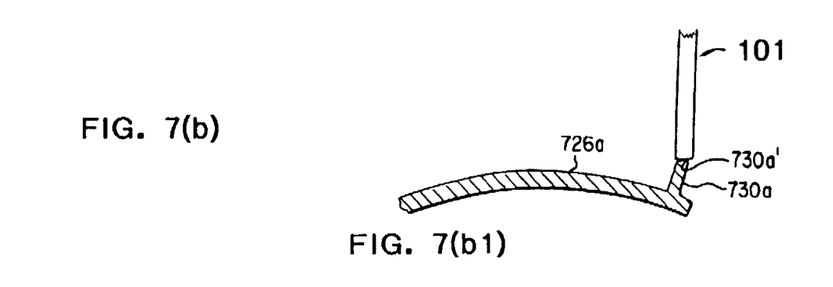
Figures 7, 7A:
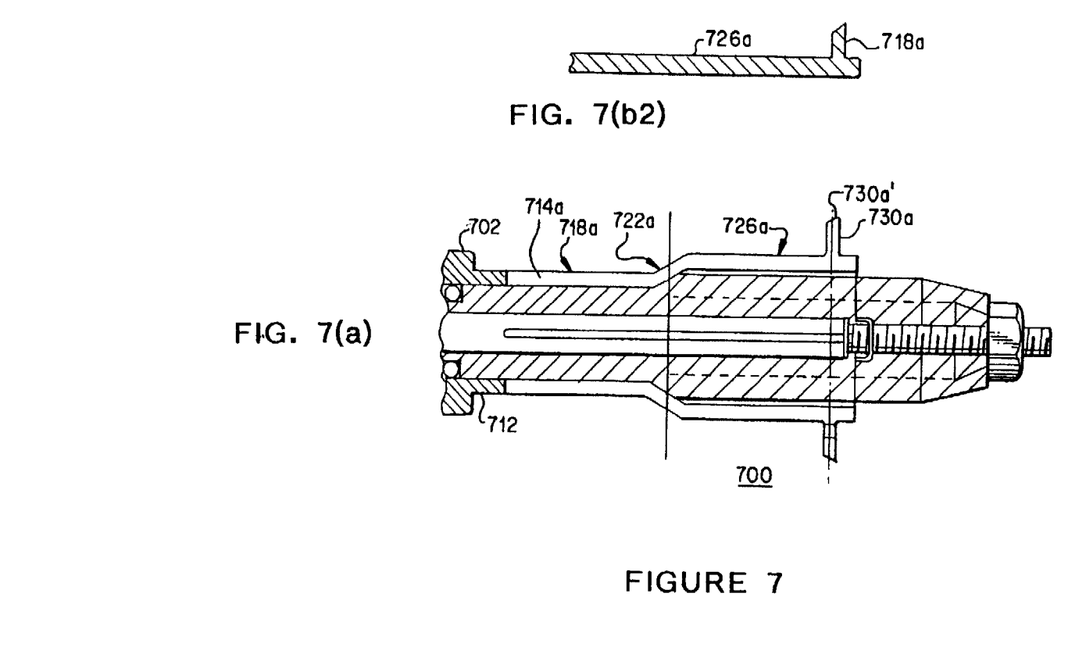

FIG. 7(b) provides an exaggerated illustration of the beneficial effects of the inward sloping surfaces 730a'–730f'. FIG. 7(b1) shows extension portion 726a of finger 714a when the collet 702 is in a nominal operating position with the disk 101 mounted thereupon. Disk 101 contains an inner surface which is substantially parallel to the axis of rotation. In the nominal operating position, extension portion 726a is in a substantially arched shape. By having the bevelled surface 730a to compensate for the arching of extension portion 726a such that in the nominal operating position surface 730a' is substantially parallel to the axis of rotation, a full surface contact is achieved with inner surface of disk 101.

FIG. 7(b2) shows the collet finger 714a in a relaxed position and shows how the surface 730a' is necessarily an inward bevel sloping toward base 712 of collet 702. Disk contact ring segments 730a–f may additionally contain grooves which are similar to the grooves 690 of FIG. 6. It is to be appreciated that the angles of the beveled surfaces 730a'–730f' are exaggerated in FIG. 7 for clarity of explanation.

It is apparent that many modifications and variations of the present invention as set forth here may be made without departing from the spirit and scope thereof. The specific embodiments described here and above are given by way of example only and the invention is limited only by the terms of the appended claims.

What is claimed is:

1. A disk clamping collet system for mounting, holding, and rotating a disk, the disk having a first thickness, said collet system comprising:

an expanding collet, including a base portion and a plurality of fingers extending a predetermined length from the base portion arranged for unrestrained cantilevered expansion, said fingers having a disk contact ring opposite the base portion for radially contacting an inner surface of the disk, said disk contact ring having a second thickness; and an expander disposed within said collet and acting on the fingers at a radial expansion contact locus to forcibly urge said fingers to radially expand such that said disk contact ring expands to radially contact the inner surface of the disk and exert an outward force thereon;

wherein the predetermined length of the fingers is sufficient to offset said disk contact ring from the radial expansion contact locus by an offset distance sufficient to ensure substantially uniform and repeatable outward forces around said disk contact portion regardless of minor surface variations along said radial expansion contact locus, and wherein the second thickness of said disk contact ring is less than the first thickness of the disk to allow for full surface texturization of the disk when mounted.

2. The disk clamping collet system according to claim 1, wherein the second thickness of said disk contact ring is less than 85 percent of the first thickness of the disk.

3. The disk clamping collet system according to claim 2, wherein the first thickness of the disk is less than 1.5 mm, and wherein the second thickness of the disk contact ring is greater than 65 percent of the first thickness of the disk.

4. The disk clamping collet system according to claim 1:

wherein said expander forcibly urges said fingers at a radial expansion contact locus; and wherein said disk contact ring is offset from the radial expansion contact locus a distance sufficient to exert a cantilever-type spring force against the inner surface of the disk when the disk is mounted around said disk contact ring and when said expander is at an axial biasing position.

5. The disk clamping collet system according to claim 4:

wherein said collet comprises a base;

wherein said disk contact ring lies a first distance from said collet base;

wherein said radial expansion contact locus lies a second distance from said base; and wherein said first distance is greater than said second distance.

6. The disk clamping collet system according to claim 5, wherein said first distance exceeds said second distance by at least 0.50".

7. The disk clamping collet system according to claim 1:

said collet system being rotatable around an axis of rotation; and said disk contact ring comprising an outer surface textured with grooves substantially parallel to the axis of rotation.

8. The disk clamping collet system according to claim 1:

said collet system being rotatable around an axis of rotation;

said collet comprising a base; and said disk contact ring comprising an outer surface which is bevelled with respect to the axis of rotation and sloping inward toward said base.

9. The disk clamping collet system according to claim 7, said collet comprising a base; and said disk contact ring comprising an outer surface which is bevelled with respect to the axis of rotation and sloping inward toward said base.

10. The disk clamping collet system according to claim 9, wherein the second thickness is about 65 to 85 percent of said first thickness.

11. A disk clamping collet system for mounting, holding, and rotating a disk for texturizing by a texturizing material in a disk texturizing process, the disk being a magnetic media disk substrate for use in a high capacity data storage system, the disk being generally rigid, the disk being annular and having an inner radius and an outer radius, the disk being of a thickness $T_d$, said collet system comprising:

an expanding collet, including a base portion and a plurality of fingers extending from the base portion, said fingers having a disk contact portion opposite the base portion for radially contacting an inner surface of the disk, said disk contact portion having an annular shape and a thickness $T_c$; and an expander disposed within said collet and acting on the fingers at a radial expansion contact locus to forcibly urge said fingers to radially expand such that said disk contact portion expands to radially contact the inner surface of the disk and exert an outward force thereon;

wherein $T_c$ is less than $T_d$ for allowing the texturizing material to overlap the inner radius of the disk during the disk texturizing process, whereby the full surface of the disk including an area adjacent to the inner radius is capable of being texturized in the disk texturization process, and wherein said disk contact portion is offset from said radial expansion contact locus by a distance sufficient to ensure substantially uniform and repeatable outward forces around said disk contact portion regardless of minor surface variations along said radial expansion contact locus.

12. The disk clamping collet system according to claim 11, said collet system being rotatable around an axis of rotation, wherein said fingers are capable of experiencing a cantilever-type deflection when the disk is mounted around said disk contact portion and when said expander is placed at an axial biasing position.

13. The disk clamping collet system according to claim 12, wherein $T_c$ is approximately 65 to 85 percent of $T_d$.

14. The disk clamping collet system according to claim 13, said disk contact portion comprising an outer surface textured with grooves substantially parallel to the axis of rotation.

15. The disk clamping collet system according to claim 14, said disk contact portion comprising an outer surface which is bevelled with respect to the axis of rotation and sloping inward toward said base, whereby said outer surface becomes substantially flush with the inner surface of the disk upon the deflection of the fingers when the disk is mounted around said disk contact portion and when said expander is placed at said axial biasing position.

16. A disk clamping collet system for mounting, holding, and rotating a disk, the disk having a first thickness, said collet system comprising:

an expanding collet, including a base portion and a plurality of fingers extending a predetermined length from the base portion arranged for unrestrained cantilevered expansion, said fingers having a disk contact ring opposite the base portion for radially contacting an inner surface of the disk, said disk contact ring having a second thickness; and an expander disposed within said collet and acting on the fingers at a radial expansion contact locus to forcibly urge said fingers to radially expand such that said disk contact ring expands to radially contact the inner surface of the disk and exert an outward force thereon;

wherein the predetermined length of the fingers is sufficient to offset said disk contact ring from the radial expansion contact locus by an offset distance sufficient to ensure substantially uniform and repeatable outward forces around said disk contact portion regardless of minor surface variations along said radial expansion contact locus, and wherein the second thickness of said disk contact ring is about 65 to 85 percent of the first thickness of the disk to allow for full surface texturization of the disk when mounted.

* * * * *